(12) United States Patent
Anandarajah et al.

(10) Patent No.: US 11,112,310 B2
(45) Date of Patent: Sep. 7, 2021

(54) DUAL-COMB SPECTROSCOPY

(71) Applicant: Dublin City University, Dublin (IE)

(72) Inventors: Prince Anandarajah, Dublin (IE); Eamonn Patrick Martin, Dublin (IE)

(73) Assignee: DUBLIN CITY UNIVERSITY, Glasnevin (IE)

( * ) Notice: Subject to any disclaimer, the term of this patent is extended or adjusted under 35 U.S.C. 154(b) by 55 days.

(21) Appl. No.: 16/555,130

(22) Filed: Aug. 29, 2019

(65) Prior Publication Data

US 2021/0063243 A1 Mar. 4, 2021

(51) Int. Cl.
| | |
|---|---|
| *G01J 3/453* | (2006.01) |
| *G01J 9/04* | (2006.01) |
| *G01J 3/427* | (2006.01) |
| G01J 3/42 | (2006.01) |
| H01S 3/23 | (2006.01) |

(52) U.S. Cl.
CPC .............. *G01J 3/453* (2013.01); *G01J 3/427* (2013.01); *G01J 9/04* (2013.01); *G01J 2003/423* (2013.01); *H01S 3/2391* (2013.01)

(58) Field of Classification Search
CPC .... G01J 3/453; G01J 3/427; G01J 9/04; G01J 2003/423; H01S 3/2391
See application file for complete search history.

(56) References Cited

U.S. PATENT DOCUMENTS

| | | | | |
|---|---|---|---|---|
| 5,748,309 | A | * 5/1998 | van der Weide | G01J 3/4338 356/326 |
| 7,019,839 | B2 | * 3/2006 | Szafraniec | G01J 9/04 356/451 |
| 7,483,143 | B2 | * 1/2009 | Sanders | G01J 3/42 356/454 |
| 8,558,993 | B2 | 10/2013 | Newbury | |
| 8,693,004 | B2 | 4/2014 | Chandler | |
| 9,244,330 | B2 | * 1/2016 | Kuo | H01S 3/0092 |
| 9,287,993 | B1 | * 3/2016 | Adleman | H04J 14/0298 |
| 9,905,999 | B2 | * 2/2018 | Li | H01S 3/0085 |

(Continued)

OTHER PUBLICATIONS

"Dual-comb spectroscopy": by I. Coddington et al., OPTICA, 3, 414-426 (2016.

(Continued)

*Primary Examiner* — Mohamed K Amara
(74) *Attorney, Agent, or Firm* — Niels Haun; Dann, Dorfman, Herrell & Skillman, P.C.

(57) ABSTRACT

A gain switched dual comb spectroscopy device for spectroscopically detecting a sample substance, comprising a first slave laser light source configured to generate a first frequency comb having a first comb free spectral range, and a second slave laser light source configured to generate a second frequency comb having a second comb free spectral range which is different from the first comb free spectral range. A master laser light source is configured to inject seed light in to both slave laser light sources therewith to injection lock the generation of both the first and the second frequency combs. A photodetector part is arranged to combine the first and the second frequency combs and to detect a beat signal the spectrum of which comprises a third frequency comb including beat tones produced by interference between the combined first and second frequency combs.

20 Claims, 8 Drawing Sheets

(56) References Cited

U.S. PATENT DOCUMENTS

| | | | | |
|---|---|---|---|---|
| 10,197,442 B2* | 2/2019 | Kieu | ............ | G01C 19/72 |
| 10,411,810 B2* | 9/2019 | Kuo | ............ | H04J 14/02 |
| 10,656,016 B2* | 5/2020 | Burghoff | ............ | G01J 3/28 |
| 10,852,617 B2* | 12/2020 | Kwon | ............ | H01S 5/141 |
| 2002/0196509 A1* | 12/2002 | Smilanski | ............ | H04J 14/005 |
| | | | | 398/194 |
| 2004/0264977 A1* | 12/2004 | Yap | ............ | G02F 2/02 |
| | | | | 398/161 |
| 2011/0043815 A1* | 2/2011 | Giaccari | ............ | G01J 3/45 |
| | | | | 356/451 |
| 2011/0069309 A1* | 3/2011 | Newbury | ............ | G01J 3/453 |
| | | | | 356/326 |
| 2011/0267625 A1* | 11/2011 | Guelachvili | ............ | G01J 3/453 |
| | | | | 356/454 |
| 2017/0256909 A1 | 9/2017 | Jules | | |
| 2020/0319029 A1* | 10/2020 | Smyth | ............ | H01S 5/12 |
| 2020/0401013 A1* | 12/2020 | Liao | ............ | G02F 1/365 |
| 2021/0063306 A1* | 3/2021 | Gianella | ............ | G01N 21/39 |
| 2021/0088740 A1* | 3/2021 | Liang | ............ | H04B 10/67 |

OTHER PUBLICATIONS

"Integrated dual optical frequency comb source": by J.K. Alexander, P.M. Anandarajah, E. P. Martin et al.; Photonics Ireland Conference 2018, Pairc ui Chaoimh, Cork, Ireland, Sep. 3-5, 2018.

\* cited by examiner

DUAL-COMB SPECTROSCOPY

The present disclosure relates in general to an apparatus for performing dual-comb spectroscopy. Particularly, but not exclusively, the present disclosure relates to dual-comb spectroscopy of a gas sample. Results produced by the dual comb spectrometer may be used to determine trace amounts of the gas sample.

BACKGROUND

Gas sensing technology is of strategic importance across a range of industries; for example manufacturing, transportation, utilities, maritime, and general environmental monitoring to name but a few. Due in part to the mounting evidence for global warming, many governments are introducing new emission regulations to reduce emissions and promote more environmentally friendly industries. Accordingly there is a general desire to be able to identify gas emissions in order to ensure these regulations are being met.

Historically trace gas detection has been conducted using thin film semiconductor detectors. More recently laser based gas sensor technology has attracted attention as an effective tool for detecting and quantifying gases. Many gases react to light at a particular frequency, making photonic gas detection systems popular. Light transmission through a gas with a higher loss (absorption) at certain frequencies in particular gases and therefore each gas has its own unique absorption profile or signature.

Typical photonic gas sensors use a swept single optical output frequency or a broadband laser to interrogate a gas sample. Narrow bandwidth optical sources, such as lasers, offer high spectral resolution but low sampling speed due to the time needed to sweep the frequency of the laser light across a sample being interrogated. Broadband light sources on the other hand offer high sampling speed because they can cover the entire spectral range required for spectroscopic interrogation of the sample but are otherwise of very low spectral resolution. Ideally a gas sampling device will have both high sampling speed and high spectral resolution.

Dual-comb spectroscopy is an emerging technique that allows for sampling of trace gases with both high spectral resolution and high speed. At present the general principles of dual-comb spectroscopy are known in the art—for example from: I. Coddington et al., *OPTICA*, 3, 414-426 (2016)—however the real-world implementation of dual-comb spectroscopy has been limited.

Hence, a dual-comb spectroscopy device suitable for delivering high sensitivity in real world applications is highly desirable.

SUMMARY

It is an object of the present invention to overcome at least one of the above or other disadvantages. Desirably, an aim of the present invention is to provide low cost gas sample detectors with high spectroscopic sensitivity.

The example embodiments disclosed herein have been provided with a view to addressing at least some of the difficulties associated with implementing dual comb spectroscopy, whether those difficulties have been specifically mentioned above or will otherwise be appreciated from the discussion herein.

According to the present disclosure there is provided a dual comb spectroscopy device as disclosed herein and a remote detector system as disclosed herein, and a method for dual comb spectroscopy disclosed herein. Additional features will be apparent from the dependent claims and the discussion herein.

Accordingly there may be provided a dual comb spectroscopy device for spectroscopically detecting a sample substance, comprising: a first slave laser light source configured to generate a first optical output, the optical spectrum of which comprises a first frequency comb having a first comb repetition frequency; a second slave laser light source configured to generate a second optical output, the optical spectrum of which comprises a second frequency comb having a second comb repetition frequency which is different from the first comb repetition frequency; a master laser light source configured to inject seed light in to both the first slave laser light source and the second slave laser light source therewith to injection lock the generation of both the first optical output and the second optical output; a photodetector part arranged to combine the first optical output and the second optical output and to detect a beat signal the spectrum of which comprises a third frequency comb including beat tones produced by interference between the combined first and second optical outputs; wherein the device comprises a sample detection area configured for receiving the sample for detection and for directing at least one of the first optical output and the second optical output to the photodetector part via the sample detection area. Advantageously, injection locking of the first and second slave laser light sources by the same one master laser light source, provides for low noise optical output to reliably produce a high sensitivity third frequency comb for spectroscopy.

The first and second slave lasers may be configured to generate mutually coherent optical frequency combs with slightly differing free spectral ranges and the two coherent combs may be caused to beat together to produce an RF (radio-frequency) spectrum of tones spaced by the difference of the two slightly differing optical comb free spectral ranges. A change in optical intensity due to optical adsorption, as one of the optical combs interacts with the sample (e.g. passes through it or reflects from it), will change the optical intensity of the RF beat spectrum (third comb) at certain spectrally relevant tone frequencies. This may be used to identify, or diagnose the sample. The master laser light may be split and coupled to two slave lasers. The slave lasers may be injection locked by the portion of the split master laser light they respectively receive so that each slave laser is individually injection locked by the respective portion of master laser light it receives.

The slave lasers may each be configured to be gain-switched, separately, in response to respective RF drive signal so as to cause each slave laser to output respective coherent optical combs simultaneously. The free spectral range of the optical comb generated by a slave laser may be determined by the frequency of the drive signal (e.g. RF) input to it, which determines the gain-switching frequency applied to the slave laser. The frequency of the drive signal input to one of the slave lasers may slightly differ from the frequency of the drive signal input to the other of the slave lasers, with the result that a corresponding difference is generated in the free spectral ranges and the two coherent optical combs simultaneously output by the two slave lasers. Gain-switching is also advantageous as it permits a small component size/footprint in the apparatus. Furthermore, the use of gain-switching in this way allows the apparatus (and the user) to controllably vary the free spectral range of the third comb (e.g. RF beat spectrum) at will by simply varying one or both of the drive signals. For example, the free spectral range of the third comb may be tuned or tunable to a frequency within the range from a few kilohertz (kHz) to 100s of megahertz (MHz).

The dual comb spectroscopy device may comprise a first slave laser drive unit configured to generate a first electrical drive signal and to input the first electrical drive signal into the first slave laser so as to gain-switch the first slave laser to drive the first slave laser to generate an optical output comprising an optical frequency comb. The dual comb spectroscopy device may comprise a second slave laser drive unit configured to generate a second electrical drive signal and to input the second electrical drive signal into the second slave laser so as to gain-switch the second slave laser to drive the second slave laser to generate an optical output comprising an optical frequency comb.

Either or both of the first and second slave lasers may be any of: a distributed feedback (DFB) laser; a vertical cavity self-emitting laser (VCSEL); a Fabry-Perot (FP) laser, a discrete-mode (DM) laser. The master laser may be configured to be adjustable to adjust the optical frequency of the seed light generated thereby. Consequently, the optical frequency of the light within the optical combs output by the slave lasers may be tuned/adjusted. The master laser may comprise an extended cavity laser (ECL) or any wavelength tunable single mode laser. This permits the optical frequency of the seed light generated by the master laser to be tuned more accurately and easily so that the dual comb spectroscopy device may be tunable to adjust the optical spectrum of the light within the optical combs output by the slave lasers.

The first drive signal may be a periodically varying signal having a first drive signal frequency (e.g. in the frequency range 0.01 GHz to 20 GHz, 0.01 GHz to 10 GHz, or 0.01 GHz to 300 MHz, or 0.01 GHz to 100 MHz). The second drive signal may be a periodically varying signal having a second drive signal frequency (e.g. in the frequency range 0.01 GHz to 10 GHz, or 0.01 GHz to 20 GHz, or 0.01 GHz to 300 MHz, or 0.01 GHz to 100 MHz). The first drive frequency may differ from the second drive frequency by a non-zero frequency difference (e.g. in the range of a few kHz to 100s of MHz). One or both of the slave laser drive units may be configured to be adjustable to vary drive signal frequency of the drive signal it generates.

In a laser light source, in general, the optical output will contain a range of frequencies. The temporal coherence of a laser light beam may be quantified by its coherence time (T) or by its coherence length (L) which is related to the coherence time by L=cT, where c is the speed of light. The coherence time gives the time duration for which the phase of a light wave train from the laser, remains stable. The coherence time (T) is inversely proportional to the spectral width of the laser light output, such that, for example, a perfectly monochromatic light source with an infinitesimally narrow line width has perfect coherence (an infinite coherence time) whereas a light source with the very broad spectral line will have a very short coherence time.

Most preferably, according to any embodiment, the line width of the master laser is no greater than 1 MHz, and is more preferably no greater than 100 kHz. Most preferably the linewidth of the master laser is selected so that the concurrent seed light signals input to the first and second slave lasers by the master laser cause the slave lasers to produce phase-coherent optical outputs (optical frequency combs) by the process of injection locking. Preferably the line width of the master laser is as small as necessary to achieve a correlation length which is equal to or greater than the optical path length between the master laser and the slave laser into which seed light is input. Preferably the seed light input to the first slave laser remains phase-coherent with the seed light input to the second slave laser at the point of respective input. This is particularly desirable so as to correlate the phase between the first and second slave lasers, as this promotes cleaner (less noisy) combs (beat tone spectrum) which are phase correlated. Without this feature, the radio frequency comb would be undesirably noisy and suffer from "frequency wander".

In this way, one common master laser light source is employed to injection lock both the first and the second slave laser light sources simultaneously. Injection locking of a laser is a known method for enforcing the lasing of the injected laser cavity at a desired optical frequency by injecting light of that optical frequency into the cavity. The master laser light source may be a low-power laser. For example, the master laser light source may be a laser configured to operate at a power output level (average power, P) in the range: $-30\,dBm<P<+10\,dBm$, or preferably in the range: $-20\,dBm<P<+5\,dBm$, or more preferably in the range: $-15\,dBm<P<0\,dBm$, such as e.g. a power output level of about $-10\,dBm$. Here, power is expressed as a power ratio (dB) with reference to one milliwatt (mW). This range(s) of power have been found to provide advantageous injection locking performance. The master laser light source may be configured to produce an optical (e.g. infrared) output with an optical frequency in the optical frequency range (THz). For example, the optical frequency range may correspond with one used in optical communications (e.g. centred around 193 THz (wavelength-1550 nm)). The master laser may emit an optical signal at 193 THz frequency. This may be arranged to lock two tones of the slave lasers frequency combs at that same frequency.

Each of the first and second slave laser light sources may be arranged to produce a respective optical output having a power level exceeding the power level of the optical output provided by the master laser light source. By the process of injection locking, a higher optical output power maybe output from the first and second slave laser light sources, but with lower intensity-noise and lower phase-noise than would normally be achieved by pumping the slave lasers independently at high power levels. Accordingly, higher output power from the first and second slave lasers may be achieved with concurrent noise levels which are strongly reduced by injecting the optical output of a low-line width, low-power (or lower-power) master laser. Provided that the operating frequencies of the respective slave lasers are sufficiently close to that of the injected master laser light, then the injection results in the slave laser lasing at the frequency of the injected master laser light. This permits generation of a slightly different optical output frequency from the two slave lasers, despite the fact that both are injected with the same frequency of master laser light, by the fact that each slave laser is driven with a slightly different RF frequency which has the effect of producing output pulses with a pulse repetition rate according to the driving RF frequency. The pulse repetition rate of the optical pulse train determines the free spectral range of the optical frequency comb (comb repetition frequency of each frequency comb).

The ability to produce high-power slave laser light at low noise, in this way, allows the first and second slave lasers to produce optical pulse trains having respective pulse repetition rates that are very closely similar, but accurately different, in a reliable and sustainable way. The pulse repetition rate (comb tone repetition frequency) difference may be sufficiently small that the closely similar spectral components (comb tones) output from the first and second slave lasers are able to interfere, when combined, to produce a beat signal defining the third frequency comb which has comb tones equal to the frequency difference between the closely similar spectral components of the first and second slave laser output signals. The frequency difference may be sufficiently small that the beat tones of the third frequency comb, produced by this interference, lies within an RF band. Consequently, the device is able to perform optical-to-RF conversion directly so as to provide immediately an output signal in the RF spectral band. Consequently, detection of the output signal may be performed using inexpensive existing RF detection apparatus and techniques. In addition, the output signal is readily able to be wirelessly transmitted via RF signal transmission techniques and apparatus, without requiring additional optical-to-RF signal conversion beforehand. This makes the invention particularly attractive for use in remote monitoring/detection whereby the output signal is wirelessly transmitted to a remote monitoring station.

The beat signal may be a radio-frequency (RF) signal the spectrum of which comprises radio-frequency beat tones. Suitably the frequency of one or more of the radio-frequency beat tones may be a value within one of: the Very High Frequency (VHF) radio frequency band; the High Frequency (HF) radio frequency band; the Medium Frequency (MF) radio frequency band, or a mmWave band or a sub-THz band. Desirably the photodetector part may be manufactured using low cost technology. VHF may be considered to be the frequency range: 30 to 300 (MHz). HF may be considered to be the frequency range: 3 to 30 (MHz). The HF range is advantageous in terms of signal quality. MF may be considered to include frequencies extending from immediately below the HF range. For example, the $n^{th}$ beat tone may be at a respective one of the frequencies defined by:

$$f_n = f_0 + nf_r, \text{ where } n=0,1,2\ldots.$$

Here, preferably $f_r<100$ MHz, or preferably $f_r<50$ MHz, or preferably $f_r<10$ MHz. Preferably, $f_r>0.5$ MHz, or preferably $f_r\sim1.0$ MHz.

The first comb repetition frequency may differ from the second comb repetition frequency by a frequency difference value within one of: the Very High Frequency (VHF) radio frequency band; the High Frequency (HF) radio frequency band; the Medium Frequency (MF) radio frequency band. Desirably a large optical spectral bandwidth may be probed.

Suitably the device may comprise: a first arm defining an optical path originating at the first slave laser light source and extending to an optical combiner; a second arm defining an optical path originating at the second slave laser light source and extending to the optical combiner; and a third arm defining an optical path originating at the optical combiner and extending to the photodetector part. Desirably one or more of the arms of the device may be provided by optical fibre. Free-space optics may be used (e.g. mirrors, lenses etc.) in this regard, as an alternative or in combination with optical fibre. Advantageously optical fibre is an efficient and practical method for constructing optical paths in compact devices, however, one or more of the first, second and third optical arms may comprise free-space optical paths employing e.g. mirrors and/or lenses and/or beam-splitters as appropriate, to direct the light.

Either the first arm may include the sample detection area, the second arm may include the sample detection area, or the third arm may include the sample detection area. The arm comprising the sample detection area may comprise a first optical path and a second optical path, wherein an end of the first optical path is aligned with an end of the second optical path, and the sample detection area is defined as an area, space, region or volume between the aligned ends of the first and second optical paths across which light may progress from the end (output) of the first optical path to an end (input) of the second optical path. Desirably the sample detection area may be an open area between the two optical paths of the arm. That is, desirably the sample detection area may be arranged to admit a gas from an ambient environment. Thus, gas sampling/detection may be enabled without requiring a means to insert gas into, for example, a sample chamber.

The first slave laser light source and the second slave laser light source may each be configured to generate the first optical output and the second optical output, respectively, by gain switching of a lasing cavity thereof. Suitably at least one of the first slave laser light source and the second slave laser light source may comprise a distributed feedback laser, or more generally a laser capable of outputting a high power. An output power level (average power, P) of a slave laser may desirably be in the range: −10 dBm<P<7 dBm, and desirably have an average power level of about 3 dBm. Desirably the first and second optical outputs are provided with sufficient power to penetrate the sample being probed without being excessively absorbed or completely absorbed.

The seed light generated by the master laser light source may be divided into a first seed light and a second seed light, wherein the first slave laser light source receives the first seed light and the second slave laser light source receives the second seed light. Desirably seed light may be provided to the two slave laser light sources while maintaining ease of construction. The device may include a passive optical coupler or splitter (e.g. configures to give a 50/50 split).

Suitably the dual comb spectroscopy device may further comprise an analyser unit configured to provide a reference beat signal, to determine a difference between the detected beat signal and the reference beat signal, and to output a sample analysis result based on the determined difference. Desirably the device may be configured to either output a signal to be analysed later or the final result, depending on the intended usage of the device. References to 'difference' may include, but are not limited to, a difference between two quantities generated by subtracting one quantity from another. Other ways of generating a suitable difference between two quantities as would be customary in the art, are also possible within the scope of the invention.

The analyser unit may be arranged to determine a plurality of differences between the detected beat signal and the reference beat signal, and to output one or more sample analysis results based on the determined differences. Desirably multiple constituents or components or elements in a sample, or multiple gasses, may be detected.

The difference between the detected beat signal and the reference beat signal may comprise a difference in the amplitude (e.g. intensity) of one or more corresponding beat tones thereof. Desirably signal amplitude may be used to provide a sample analysis result. Suitably the more information that is available to the analyser unit the more accurate the result will be.

The device may comprise a radio signal transmitter unit including a transmitter antenna configured to wirelessly transmit an RF signal corresponding to the beat signal. Advantageously long distance sample analysis may be provided. An RF (radio-frequency) signal transmitter may be operatively connected to the photodetector to convert photodetection signals into RF signals suitable for wireless transmission, or via an RF waveguide or the like, as appropriate.

Desirably the device may form part of a remote detector system for remotely detecting a sample substance, wherein the system additionally comprises a receiver unit remote from the device and including a receiver unit including a receiver antenna configured to wirelessly receive the RF signal corresponding to the beat signal.

In one aspect of the invention the device forms a gas sensor whereby the sample substance is a gas sample. The device may be arranged to obtain sample information by any of the following techniques: optical reflection; optical transmission; optical scattering; optical diffusion.

In one aspect of the invention a remote detector system is provided in which the sampling device resides upon a vessel and the receiver unit does not reside on the vessel.

In another aspect, the invention provides a method of dual comb spectroscopy for spectroscopically detecting a sample substance, comprising, generating a first optical output from a first slave laser light source, the optical spectrum of which comprises a first frequency comb having a first comb free spectral range, generating a second optical output from a second slave laser light source, the optical spectrum of which comprises a second frequency comb having a second comb free spectral range which is different from the first comb free spectral range, injecting seed light from a master laser light source in to both the first slave laser light source and the second slave laser light source therewith to injection lock the generation of both the first optical output and the second optical output, directing at least one of the first optical output and the second optical output through or via the sample substance, and combining the first optical output and the second optical output at a photodetector and therewith detecting a beat signal the spectrum of which comprises a third frequency comb including beat tones produced by interference between the combined first and second optical outputs.

Preferably, the beat signal is a radio-frequency (RF) signal the spectrum of which comprises radio-frequency beat tones. The frequency of one or more of the radio-frequency beat tones may be a value within one of: the Very High Frequency (VHF) radio frequency band; the High Frequency (HF) radio frequency band; the Medium Frequency (MF) radio frequency band. Preferably, the first comb free spectral range differs from the second comb free spectral range by a frequency difference the value of which is within one of: the Very High Frequency (VHF) radio frequency band; the High Frequency (HF) radio frequency band; the Medium Frequency (MF) radio frequency band.

The method may further comprise: directing the first optical output along a first optical path originating at the first slave laser light source; directing the second optical output along a second path originating at the second slave laser light source; and combining the first optical path and the second optical path thereby to direct the first optical output and the second optical output in combination along a third optical path extending to the photodetector.

The method may include directing at least one of the first optical output and the second optical output through or via the sample substance along either: the first optical path; the second optical path; or the third optical path.

The method may include generating the first optical output and the second optical output, respectively, by applying gain switching to a lasing cavity of the first slave laser light source and the second slave laser light source.

The method may include including splitting the seed light generated by the master light source into a first seed light and a second seed light, and receiving the first seed light at the first slave laser light source and concurrently receiving the second seed light at the second slave laser light source.

The method may further comprise, providing a reference beat signal, determining a difference between the detected beat signal and the reference beat signal, and outputting a sample analysis result based on the determined difference. The method may include determining a plurality of differences between the detected beat signal and the reference beat signal, and outputting one or more sample analysis results based on the determined differences. Preferably, a said difference between the detected beat signal and the reference beat signal comprises a difference in the amplitude of one or more corresponding beat tones thereof.

This may include wirelessly transmitting an RF signal corresponding to the beat signal. The method may include remotely detecting a sample substance comprising the method described above, and including wirelessly receiving the RF signal corresponding to the beat signal at a receiver unit remote radio signal receiver.

An aspect of the invention provides a method of gas sensing comprising the method described above, wherein the sample substance is a gas sample.

BRIEF DESCRIPTION OF THE DRAWINGS

For a better understanding of the present disclosure reference will now be made to the accompanying drawings, in which:

FIG. 5 shows further example devices.

DETAILED DESCRIPTION

At least some of the following example embodiments provide an improved device and/or system for sample detection, such as gas detection. An example dual comb spectrometer device is demonstrated which provides enhanced detection sensitivity with minimal physical footprint and low production cost. At least some examples provide improved accuracy and speed of detection. Many other advantages and improvements will be discussed in more detail herein.

Principles of Dual-Comb Spectroscopy

A frequency comb may be regarded as a spectral characteristic of the optical output of a suitably controlled laser source. In particular, the laser source may be suitably controlled to generate an optical output whose spectrum consists of a series of discrete, equally spaced (in frequency) spectral lines. Frequency combs can be generated by periodic modulation of the amplitude or phase of a continuous-wave laser, as is known in the art. Alternative methods for generating frequency combs include the use of four-wave mixing in nonlinear media, or via a mode-locked laser.

A laser running on multiple modes (each having a mode frequency), may provide a pulsed laser output. That is to say, when the modes sum within the laser cavity the result is a pulse of laser light of short time duration: the more modes that contribute, the shorter the pulse duration. By configuring the laser to generate multiple single time-spaced pulses, mutually separated in time by an interval T seconds, the laser output becomes a train of discrete, short laser pulses:

$$E(t) = \sum_n E_{single}(t - nT)$$

Here, $E_{single}(t)$ is the electric field of a given single pulse. In the limit of a large number of successive such pulses, the intensity of this pulse train is given by:

$$|E(t)|^2 = |E_{single}|^2 \sum_n \delta(\omega T - 2\pi n)$$

Here $\omega$ is the angular frequency associated with the single pulse, $E_{single}(t)$. This defines a spectral comb with comb tones separated, each one from its neighbour, by a frequency value equal to the pulse repetition rate: $f_r = 1/T$.

Figure 1:
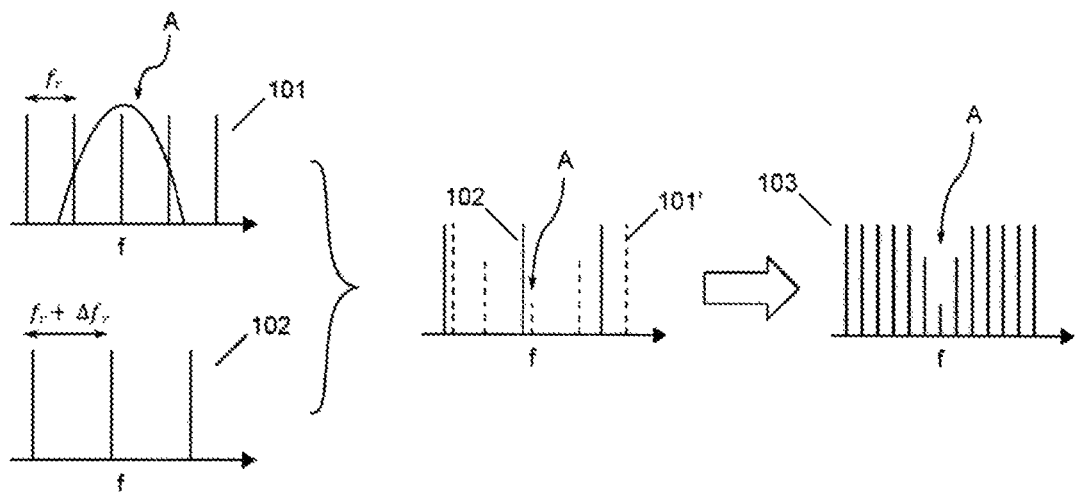
FIG. 1 shows the principles of dual-comb spectroscopy in operation.

FIG. 1 shows the principles of dual-comb spectroscopy in operation. Two optical signals are shown, each having a frequency spectrum comprising a frequency comb, and each signal is represented in FIG. 1 by its frequency comb. Each frequency comb comprises a succession of frequency components (tones) separated by a regular frequency spacing, $f_r$, known as the comb free spectral range. This is related to the pulse repetition rate $f_r = 1/T$ of the laser producing the respective optical signal.

Here, a first frequency comb 101 is provided with a specific free spectral range $f_r$. Typically, the free spectral range, will be in the gigahertz range for gas sampling applications. For example, the repetition rate may be any value equal to or less than about 10 GHz, such as in the range of 0.01 GHz to 10 GHz, preferably. This has been found to provide a good number of beat tones. A second frequency comb 102 is provided having a free spectral range of $f_r + \Delta f_r$. The difference in free spectral range between the first frequency comb 101 and second frequency comb 102, $\Delta f_r$, may be of the order of kilohertz, such as 100 kHz. The two frequency combs 101, 102 may be provided by two separate lasers each at different respective laser pulse repetition rates.

One of the frequency combs, in this case, the first comb 101, is arranged to interact with a sample under investigation (e.g. a gas) while the other, here the second comb 102, does not. In the example of FIG. 1 the sample has a particular absorption spectral profile 'A', shown by the curved line, overlapping the middle three teeth of the first comb 101. Absorption of the first frequency comb 101 by the sample results in a modified frequency comb 101' whereby certain teeth, i.e. tones or frequencies of the frequency comb 101', will be reduced in amplitude due to absorption by the sample.

Thus the first frequency comb 101 provides an absorption spectrum for the sample. Historically such a spectrum would be recorded and analysed in isolation.

In dual comb spectroscopy however the (usually un-modified) second frequency comb 102 is combined with the modified first frequency comb 101'. This photo-mixing of the modified first frequency comb and the un-modified second frequency comb (101', 102) results in a beat frequency signal 103 that has a lower comb repetition rate than either the first or second frequency combs 101, 102. In other words, interference of the modified first frequency comb and the un-modified second frequency comb (101', 102) results in a third frequency comb 103 which has a repetition rate equal to the difference in comb repetition between the interfering first and second frequency combs 101', 102. The third frequency comb, according to preferred embodiments of the invention, is at a frequency in the RF domain. The beat signals produced by dual comb spectroscopy are often referred to as heterodyne signals by the field at large.

In particular, consider the electric field $E_1(t)$ associated with a comb tone (at frequency $f_1$) of the first frequency comb, combined with the electric field $E_2(t)$ associated with a comb tone (at frequency $f_2$) of the second frequency comb, where:

$$E_1(t) = a_1 \exp[i\omega_1 t - k_1 x]$$

$$E_2(t) = a_2 \exp[i\omega_2 t - k_2 x]$$

The combined electric field is:

$$|E_1(t) + E_2(t)|^2 = |a_1 \exp[i\omega_1 t - k_1 x] + a_2 \exp[i\omega_2 t - k_2 x]|^2$$

Which shows that:

$$|E_1(t) + E_2(t)|^2 \sim A \cos[(\omega_2 - \omega_1)t] = A \cos[(f_2 - f_1)2\pi t]$$

Thus, the tone produced in the third frequency comb, by interference between two closely adjacent tones of the first and second frequency combs, is located at a frequency given by the frequency difference $(f_2 - f_1)$ of the two interfering tones. This applies separately to each pair of interfering tones of the modified first frequency comb and the un-modified second frequency comb, in generating a respective tone of the third frequency comb.

Importantly, there is a mapping between the high frequency optical signals produced by the modified first frequency comb and the un-modified second frequency comb (101', 102) and the resulting heterodyne signal 103. In other words, a tone of the beat signal 103 is map-able to a tone of the frequency comb which propagates through the sample.

In this way absorption features which manifest in the third frequency comb 103, as shown by 'A' in FIG. 1, may be used to determine which frequencies of the original frequency comb 101 were absorbed by the sample so as to cause the modified first frequency comb 101'. In other words, by working backwards from the third frequency comb 103 one can determine the original absorption spectrum of a sample as presented in the modified first frequency comb 101'. Such information can then be used to determine the elements of that sample which would contribute to the spectrum.

A Dual-Comb Spectroscopy Device

Figure 2:
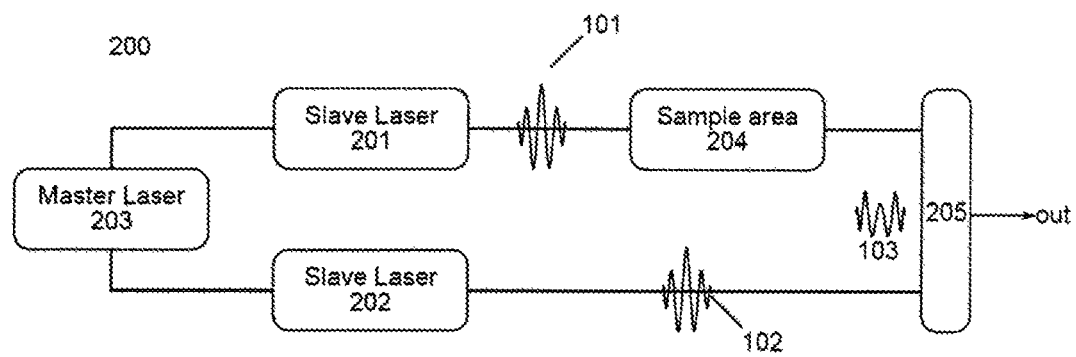
FIG. 2 shows an example dual-comb spectroscopy device.

FIG. 2 shows a schematic diagram an example dual-comb spectroscopy device 200, according to an embodiment of the invention. The dual-comb spectroscopy device 200 comprises a first slave laser light source 201, a second slave laser light source 202, a single master laser light source 203, a sample detection area 204, and a photodetector part 205.

The first slave laser light source 201 is configured to generate a first optical output. The optical spectrum of the first optical output comprises a first frequency comb 101 having a first comb free spectral range $f_1$. The second slave laser light source 202 is configured to generate a second optical output. The optical spectrum of the second optical output comprises a second frequency comb 102 having a second comb free spectral range which is different from the first comb free spectral range $f_2$. The difference between the comb free spectral ranges $f_1-f_2$ is $\Delta f_r$, as discussed above in relation to FIG. 1.

Preferably the first and second optical outputs are generated in the infra-red electromagnetic band. Also preferably the first comb free spectral range $f_1$ differs from the second comb free spectral range $f_2$ by a frequency difference value within one of: the Very High Frequency, VHF, radio frequency band; the High Frequency, HF, radio frequency band; the Medium Frequency, MF, radio frequency band.

Suitably the first slave laser light source 201 and second slave laser light source 202 generate laser emissions in pulses, and the generated first frequency comb 101 and second frequency comb 102 are both contained within a Fourier spectrum (frequency spectrum) of the sequence of pulses output by the respective slave laser light source 201, 202. Preferably generation of a laser pulse by the first and/or second slave laser light source 201, 202 is achieved through gain switching of a laser cavity of the respective slave laser source.

Suitably one or both of the slave laser sources 201, 202 may be provided as a distributed feedback laser. Distributed feedback lasers are a particular type of Fabry-Perot etalon laser source, and so alternative laser sources of this form would also be suitable. However, in general, any laser source capable of generating a frequency comb would be appropriate for use.

The master laser light source 203 is configured to inject seed light in to both the first slave laser light source 201 and the second slave laser light source 202. The seed light is used to injection lock the generation of the first and second optical outputs by the first and second slave laser light sources 201, 202. In this way the generation of the two frequency combs 101, 102 is synchronised.

Injection locking forces the two slave laser sources 201, 202 to lase at the same central optical frequency and also generate laser emissions that are in phase with each other. In other words, the two slave laser sources are configured to generate laser emission with the same central wavelength and the first and second frequency combs 101, 102 will be in phase. In addition, injection locking advantageously produces laser emission with low noise, and it has been found that phase locking the first and second slave laser sources 201 and 202 (frequency combs 101, 102) provides higher resolution and spectral sensitivity.

The sample detection area 204 is configured to receive a sample for detection, such as a gas, and is positioned such that at least one of the first optical output and second optical output is directed through the sample detection area 204 before being output to the photodetector part 205. In other words, at least one of the first frequency comb 101 and second frequency comb 102 propagate through the sample detection area 204, which in the example of FIG. 2 is the first frequency comb 101. Here the frequency comb 101 that interacts with a sample in a sample area may be more generally regarded as a probe comb, while the second slave laser 202 provides a reference frequency comb 102.

The photodetector part 205 is arranged to combine the first optical output and the second optical output. In other words, the photodetector part is arranged to combine and detect the modified first frequency comb 101' and the second frequency comb 102. As discussed above in relation to FIG. 1, photo-mixing of the first (modified) and second frequency combs 101, 102 generates a beat signal 103 with a spectrum comprising a third frequency comb 103. The third frequency comb 103 includes beat tones produced by interference between the combined first (modified) and second optical outputs. This beat signal has a lower frequency than the first (modified) and second frequency combs 101', 102 and thus the photodetector part 205 is configured to detect this lower frequency signal 103. When a sample is present in the sample detection area 204 the first frequency comb 101 will be modified by the sample. In particular part of the first frequency comb 101 will be absorbed, thereby producing the modified first frequency comb 101', which will result in a beat signal 103 having modified tone amplitudes, which is then detected by the photodetector part 205.

In general, for optical frequency outputs from the first and second laser light sources 201, 202, the resultant beat signal will be in the radio frequency electromagnetic range. This is enabled by ensuring that $f_1-f_2=\Delta f_r$ is a radio-frequency value. For example, the frequency of one of more of the radio-frequency beat tones of the beat signal preferably is a value within one of: the Very High Frequency, VHF, radio frequency band; the High Frequency, HF, radio frequency band; the Medium Frequency, MF, radio frequency band.

Normally a spectrum which is recorded in the optical frequency range—i.e. the frequency of operation of the first and second slave laser light sources 201, 202—would require expensive optical (IR) detectors to analyse. Advantageously an optical spectra produced by a frequency comb propagating through a sample may instead be downscaled to the radio frequency range via the beating effect with the second frequency comb. Low bandwidth (radio frequency) detectors are much cheaper to produce than Fourier transform specrometers, and suitably the photodetector part 205 may be preferably configured to detect signals particularly in the radio frequency band.

Figure 3:
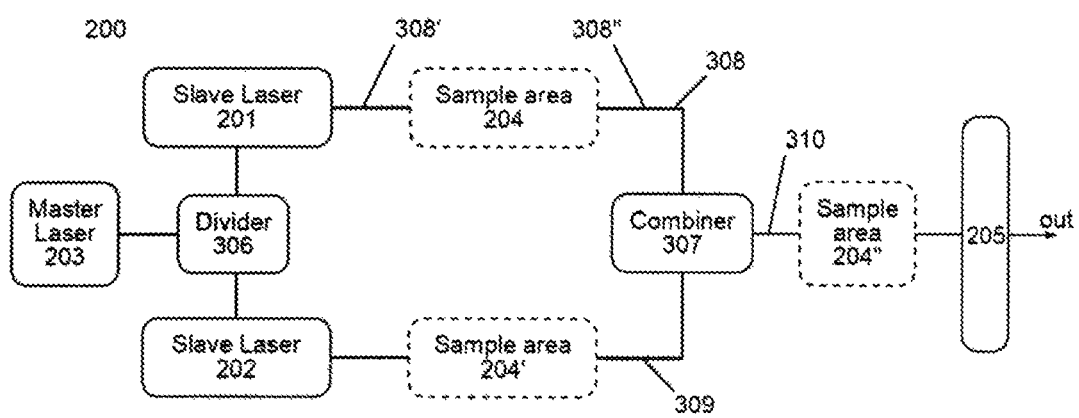
FIG. 3 shows another example dual comb spectroscopy device.

FIG. 3 shows a schematic diagram of another example dual comb spectroscopy device 200 which builds on the previous discussion. Here the light provided by the master laser light source 203 is divided into a first seed light and a second seed light. The first seed light is provided to the first slave laser light source 201 and the second seed light is provided to the second slave laser light source 202.

One way to divide the seed light generated by the single master laser light source 203 is to use of a 50/50 beam splitter or divider 306. Alternative methods, such as a partial mirror, or beam splitter may be used instead.

In the example of FIG. 3, the dual comb spectroscopy device 200 is provided with three arms, or optical paths. These arms define the directions of propagation of the frequency combs. The first arm 308 originates at the first slave laser 201 and ends at an optical combiner 307. Similar to the divider 306, the optical combiner 307 may be generally any other kind of beam combiner known in the art. The second arm 309 originates at the second slave laser light source 202 and ends at the same optical combiner 307. The third arm 310 originates at the optical combiner 307 and ends at the photodetector part 205.

In the example shown, the first optical output initially propagates along the first arm 308 and the second optical output initially propagates along the second arm 309. At the optical combiner 307 the two optical outputs are directed toward the photodetector part 205, whereby the constituent frequency combs are combined to produce a beat signal 103 as before.

The first, second and third arms 308-310 may be realised using optical fibre, or an optical waveguide such as in an integrated photonic chip. Preferably all the arms are provided by optical fibre or waveguide although it will be appreciated that a combination of optical fibre and/or waveguide and other optical instruments may be used to provide one or more of the first, second and third arms 308-310. In other words at least one of the first arm 308, second arm 309 and third arm 310 may be provided by optical fibre or waveguide. It will also be appreciated that this could be a single length of optical fibre or waveguide or multiple separate lengths joined together.

As shown in FIG. 3, the sample detection area (204, 204', 204") may be located along any of (or some of, or each of) the first, second and third arms 308-310. That is, the first arm 308 may include the sample detection area 204, the second arm 309 may include the sample detection area 204', or the third arm 310 may include the sample detection area 204". The first frequency comb 101 will propagate through a sample detection area 204 in the first arm 308, the second frequency comb 102 will propagate through a sample detection area 204' in the second arm 309, and both frequency combs 101 & 102 will propagate through a sample detection area 204" in the third arm 310.

The sample detection area 204 may be regarded as separating the arm 308-310 in which it is placed into two optical paths: before and after the sample detection area 204. For example, where the relevant arm is the first arm 308, the first arm 308 may be regarded as comprising a first optical path 308' and a second optical path 308", wherein an end of the first optical path 308' is aligned with an end of the second optical path 308", and the sample detection area 204 is defined as an area between the aligned ends of the first and second optical paths 308', 308".

When the sample detection area 204 is part of the first arm 308 then the first frequency comb 101 may regarded as a probe comb and the second frequency comb 102 as the reference comb. Vice versa the second frequency comb 102 will be the probe comb and the first frequency comb 101 the reference comb when the sample detection area 204' is part of the second arm 309. When the sample detection area 204" is part of the third arm both frequency combs 101, 102 are regarded as probe combs and there is no specific reference comb.

A probe comb passing through a sample placed in the sample detection area 204 or 204' will be modified in amplitude and phase compared to the reference comb. Thus the detector 205 may be configured to detect both the phase and amplitude of the received beat signal 103. When the sample detection area 204" is configured as part of the third arm 310 then there will be no relative phase difference in the signal detected by the photodetector part 205 because both the first and second frequency comb will be phase shifted in the same manner by the sample.

Figure 4:
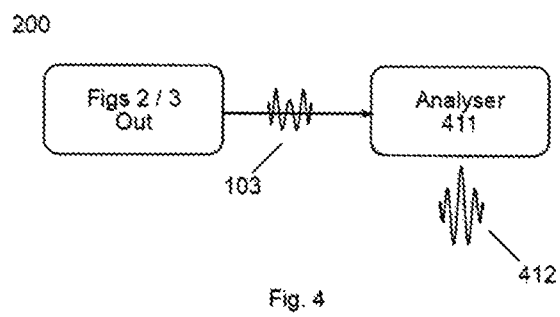
FIG. 4 shows a further example dual-comb spectroscopy device.

FIG. 4 shows a variation of the dual-comb spectroscopy device 200 shown in FIGS. 2 & 3. In this example the dual-comb spectroscopy device 200 comprises all the features of FIG. 2 or 3 and additionally an analyser unit 411.

The analyser unit 411 is configured to provide a reference beat signal 412 that is generated by photo-mixing of the first and second frequency combs 101, 102 when there is no sample present in the sample detection area 204. This reference signal 412 is used in the analysis of the spectral beat signal 103 produced when a sample is present in the sample detection area 204. The reference signal 412 may be stored in a memory of the analyser 411 unit or may itself be provided to the analyser unit 411 by an external device such as a computer. In the latter configuration, the analyser unit 411 is configured to store the reference signal at least temporarily in, for example, flash memory.

The analyser unit 411 is configured to take the signal from the photodetector part 205 and analyses the detected beat (spectral) signal 103 to determine a difference between the detected beat signal 103 and the reference beat signal 412. Based on any determined differences, the analyser unit 411 is configured to output a sample analysis. For example, when the sample is a gas, the analyser unit may determine the presence of that gas by its absorption effect upon the detected beat tones.

Different elements/substances present in the sample detection area 204 will modify the input frequency comb on different tones. As such the analyser unit 411 is configurable to determine the presence of substances/elements (e.g. gasses) from the detected difference between the spectral beat signal 103 and the reference beat signal 412. That is the analyser unit 411 is arranged to determine a plurality of differences between the detected beat signal and the reference beat signal, and to output one or more sample analysis results based on the determined differences.

Suitably, because a difference in the beat signal 103 compared to the reference signal 411 will manifest (at least partly) as a difference in amplitude on one or more of the corresponding beat tones, the analyser unit 411 is configured to output a sample result based on a determined difference in tonal amplitude.

For many applications it will be desirable for an operator of the dual-comb spectroscopy device 200 to be remote from the device itself. Thus, while in the above Figures the dual-comb spectroscopy device has been discussed with an implicit compactness, it will be appreciated that the device 200 may be modified to provide such remote usage. For example, the first and second arms 308 and 309 may be arranged to involve long distance (e.g. kilometres of) optical fibre. It would also be appropriate to introduce any length of electronic wire between the detector 205 and analyser unit 411, such that the device as described in FIGS. 2 & 3 may connect with an analyser unit 411 which is positioned in the vicinity of an operator of the device.

FIG. 5 shows yet further example devices 200 with the aim of providing remote functionality. FIG. 5 builds on the principles of FIGS. 2 to 4. In this example, the dual-comb spectroscopy device 200 further includes a transmitter 513. The transmitter 513 is configured to transmit signals wirelessly through any known method; for example, radio transmission, Wi-Fi, Bluetooth, ZigBee, to name but a few. Suitably the transmitter 513 may include an antenna 514 configured to transmit the beat signal 103.

Figure 5A:
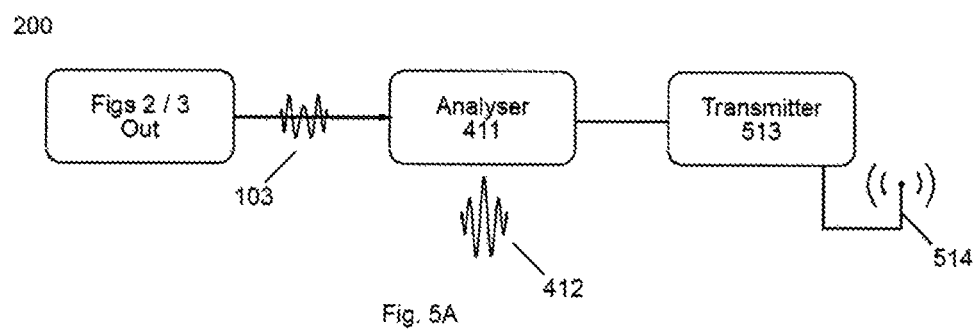
FIG. 5A shows another example dual-comb spectroscopy device.

As shown in FIG. 5A, the transmitter unit 513 is connected to the analyser unit 411. In this configuration, the dual-comb spectroscopy device is capable of transmitting analysed spectrometer data to an operator of the device.

Figure 5B:
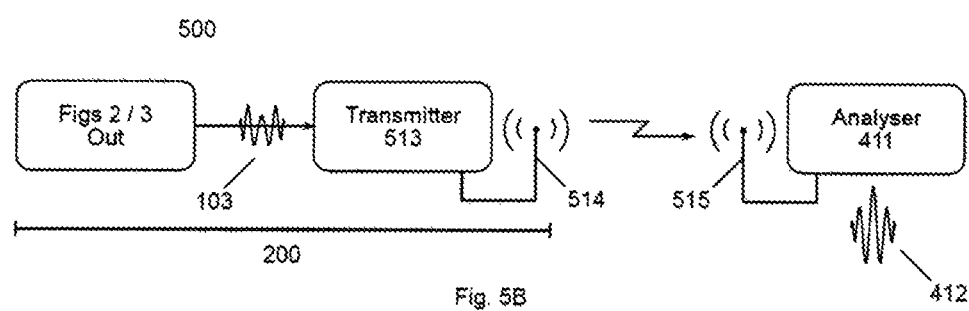
FIG. 5B shows a system incorporating an example dual comb spectroscopy device.

FIG. 5B shows a system configuration 500 whereby the transmitter 513 is connected to the photodetector part 205. In this configuration, the transmitter 513—which forms part of the device 200—transmits the spectral beat signal data 103 to the analyser unit 411 wirelessly. Suitably the analyser unit may be connected to a receiver unit 515 for wirelessly receiving the beat signal 103 from the transmitter 513. Analysis of the spectral beat signal 103 can thus be performed remotely from the remainder of the dual-comb spectroscopy device 200.

Figure 6:
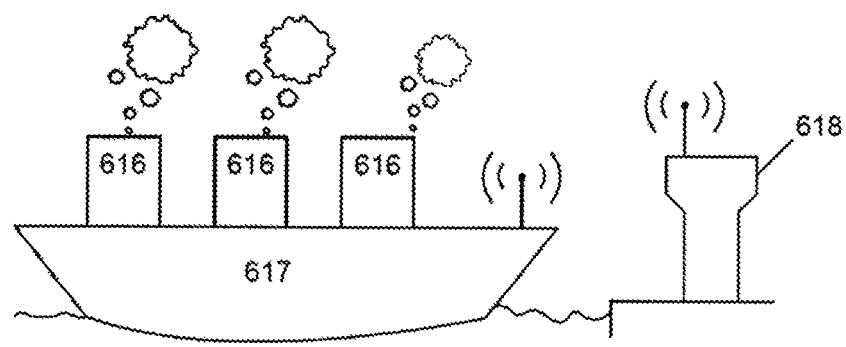
FIG. 6 shows an example dual-comb spectroscopy device 200 configured as a remote gas sampling device.

The system 500 of FIG. 5B is particularly suitable where co-location of the analyser unit 411 and remainder dual-comb spectroscopy device 200 is not appropriate. FIG. 6 shows one such example whereby the dual-comb spectroscopy device 200 described above is configured as a gas sensor for sampling a gas sample.

In the present example gas cells 616 are being transported by ships at sea 617, and emissions from those gas cells are monitored by a regulatory control tower 618 on land. In other words, in the present example the receiver unit 515 and analyser unit 411 are remote from the device 200. More specifically the receiver unit 515 and analyser unit 411 do not reside on the vessel 617, and the dual comb spectroscopy device 200 is placed within a gas cell 616 to detect the ambient gas.

Thus, dual-comb spectroscopy devices may be manufactured according to FIGS. 2 & 3 with either individual transmitters (FIG. 5B) or a single transmitter for the group of spectroscopy devices 200 (not shown). These devices may be manufactured with a small profile such that they can easily be inserted into the gas cells 616. Advantageously the devices may be manufactured cheaply, and therefore suitable for replacement, whilst more costly analysing components may be implemented only once at the regulatory control tower 618. In particular, the analyser unit 411 could be configured as software on a pre-existing computer, and may be configured to receive beat signals 103 from any number of individual gas sensor units.

As alluded to above, a major benefit of the proposed device is that it is easy to manufacture cheaply in large quantities. Suitably the dual-comb spectroscopy device of the present disclosure may be manufactured as a single chip.

As will be evident from the discussion herein, the dual comb spectroscopy device of the present disclosure is capable of detecting and monitoring trace gases with high sensitivity in real world applications. The described device is cheap to manufacture and is therefore suitable for deployment in high degradation environments.

Figure 7:
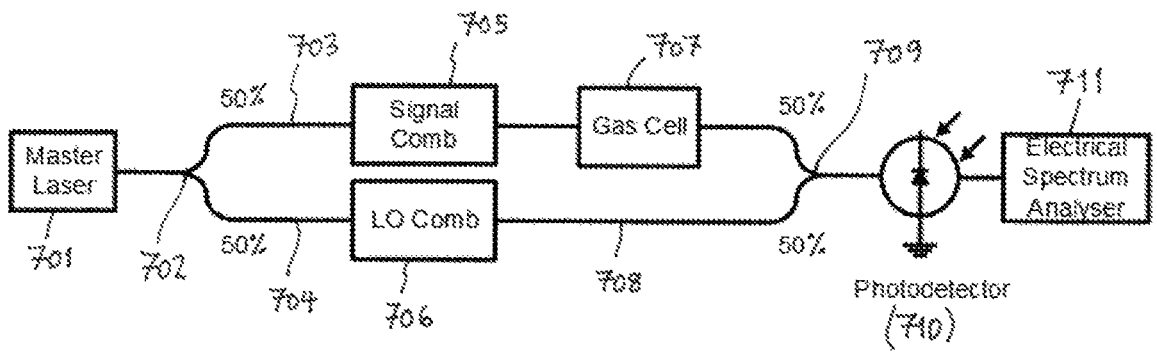
FIG. 7 shows another example of a dual comb spectroscopy device.

FIG. 7 schematically illustrates the dual comb spectroscopy device for spectroscopically detecting a sample gas, according to an embodiment of the invention. The device comprises a master laser light source 701 the output of which is optically coupled to a first slave laser light source 705 and a second slave laser light source 706, via an optical coupler 702 arranged to receive the optical output of the master laser light source, and to split the optical output equally (50%/50%) into two parts (703, 704) and to direct a respective one of each of those two optical output parts to a respective one of the first and second slave laser light sources.

The master laser light source is configured to provide its optical output for use as seed light to inject into both of the first and second slave laser light sources simultaneously, therewith to injection-lock the optical output generated by the first slave laser and the second slave laser, to the same master laser. Both the first slave laser and the second slave laser are controlled by a process of gain-switching, using a high-power RF signal, to generate two coherent optical combs simultaneously. Due to the injection-locking by the master laser, the two optical combs are caused to be coherent.

Figure 14A:
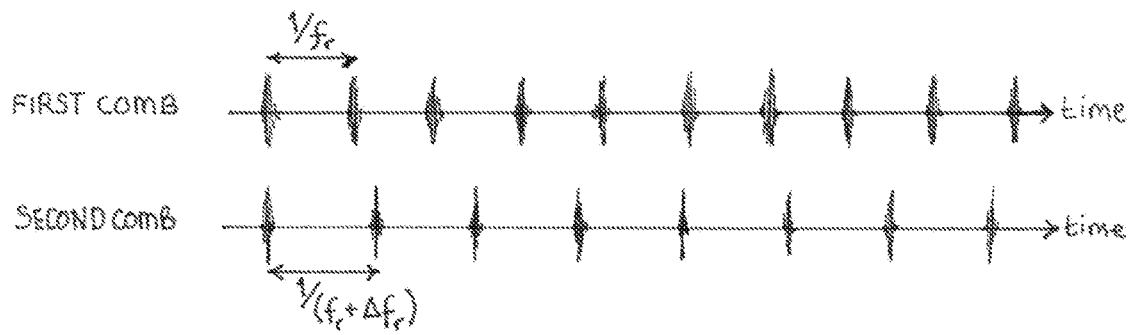
FIGS. 14A and 14B show schematically a process of RF comb generation using optical combs.

The free spectral range ($f_r$) of the optical comb generated by the first slave laser (see FIG. 14A: the first optical comb) differs slightly from the free spectral range ($f_r+\Delta f_r$) of the optical comb generated by the second slave laser (see FIG. 14A: the second optical comb). The first optical comb is output from the first slave laser along a first optical path which passes through a gas cell 707 containing a gas to be detected/measured spectroscopically by the device whereas, concurrently, the second optical comb is output from the second slave laser along a second optical path 708 containing no such gas cell.

The first optical path and the second optical path extend to a second optical coupler 709 arranged to combine the first optical comb (which may be modified by interaction with gas in the gas cell 707) and the second optical comb in equal proportion for onward transmission along a third optical path towards a photodetector 710. Upon reaching the photodetector, the combined first optical comb (modified) and the second optical comb (see FIG. 14B: optical frequency, terahertz) interfere the form beat tones (see FIG. 14B: radio frequency, megahertz) upon the photodetector, as described above. These beat tones repeat with a free spectral range in the frequency domain (megahertz) and are measured as an electrical signal by an electrical spectrum analyser 711.

The modified first optical comb when viewed in the frequency domain (FIG. 14B) displays comb signals that are attenuated at specific frequencies corresponding to absorption bands within the gas contained within the gas cell 707, whereas the second optical comb does not. This also reveals itself in the beat tones generated by interference of the two optical combs. Specific gases may therefore be identified spectroscopically according to the spectral position of the adoption feature detected within the radio-frequency beat tones generated by the electrical spectrum analyser 711.

Figure 8:
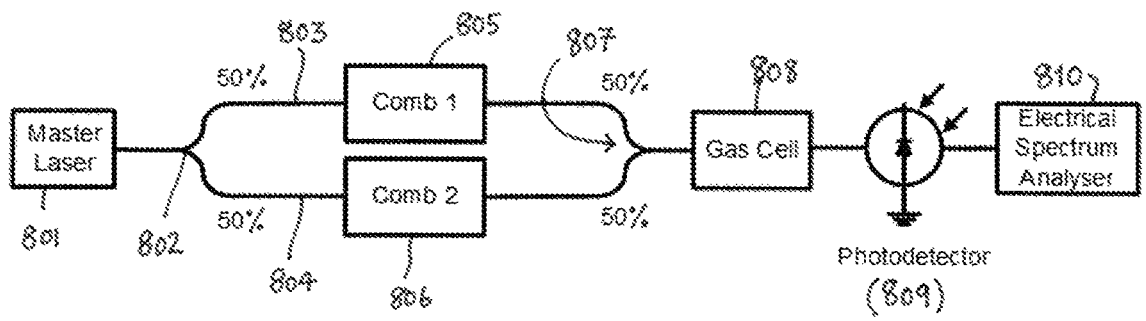
FIG. 8 shows a further example of a dual comb spectroscopy device.

FIG. 8 schematically illustrates an alternative embodiment very similar to the embodiment illustrated in FIG. 7, whereby the master laser 801 produces seed light split by a 50%/50% optical coupler 802 for injection (803, 804) into a first slave laser 805, and a second slave laser 806, concurrently in the manner described with reference to FIG. 7. The first and second slave lasers each generate a respective first optical comb, and a second optical comb coherently through the process of injection-locking to the common master laser signal injected into them. The first and second optical combs are combined by a 50%/50% optical coupler 107 which directs the combined first and second optical combs together into a gas cell 808 containing a gas to be spectroscopically sampled. Upon passing through the gas cell, the first and second optical combs interfere to form beat tones on a photodetector 809, and these beat tones are spectroscopically analysed by an electrical spectrum analyser 810, in the manner described above and with reference to FIG. 14A and FIG. 14B.

Figure 9:
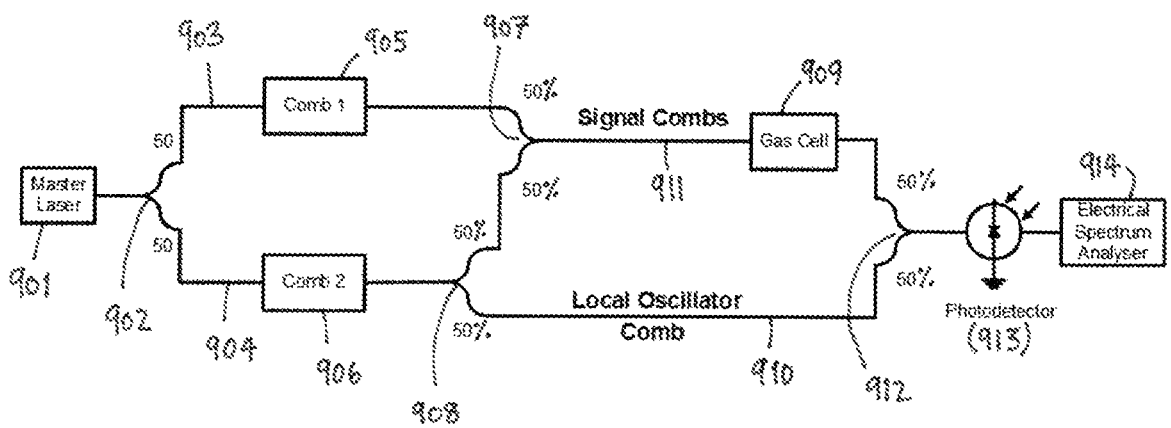
FIG. 9 shows yet another example of a dual comb spectroscopy device.

FIG. 9 schematically illustrates another alternative embodiment, whereby the master laser 901 produces seed light split by a 50%/50% optical coupler 900 and for injection (903, 904) into a first slave laser 905, and a second slave laser 906, concurrently in the manner described with reference to FIG. 8. The first and second slave lasers each generate a respective first optical comb, and a second optical comb coherently through the process of injection-locking to the common master laser signal injected into them. The first and second optical combs are each subsequently split by a separate respective 50%/50% optical coupler (107, 908) wherein 50% of the intensity of the first optical comb is input to a first optical input of a first optical coupler 907 and 50% of the intensity of the second optical comb is input to a second optical input of that first optical coupler 907 whereby these input parts of the first and second optical combs are combined by the first optical coupler and output from it as a combined optical output 911. Concurrently, the second optical coupler 908 is configured to split the intensity of the second optical comb such that 50% of the intensity is transmitted to the second optical input of the first optical coupler 907 whereas the other 50% of the intensity is directed along a separate optical path 910.

The combined optical output 911 from the first optical coupler (combiner) is directed into a gas cell 909 containing a gas to be spectroscopically sampled. Upon passing through the gas cell, the first and second optical combs are subsequently input to a third optical coupler 912 arranged to combine the optical output from the gas cell with the 50% of the intensity of the second optical comb within the separate optical path 910 emanating from the second optical coupler 908. These combined optical inputs interfere to form beat tones on a photodetector 913, and these beat tones are spectroscopically analysed by an electrical spectrum analyser 914, in the manner described above and with reference to FIG. 14A and FIG. 14B.

Figure 10:
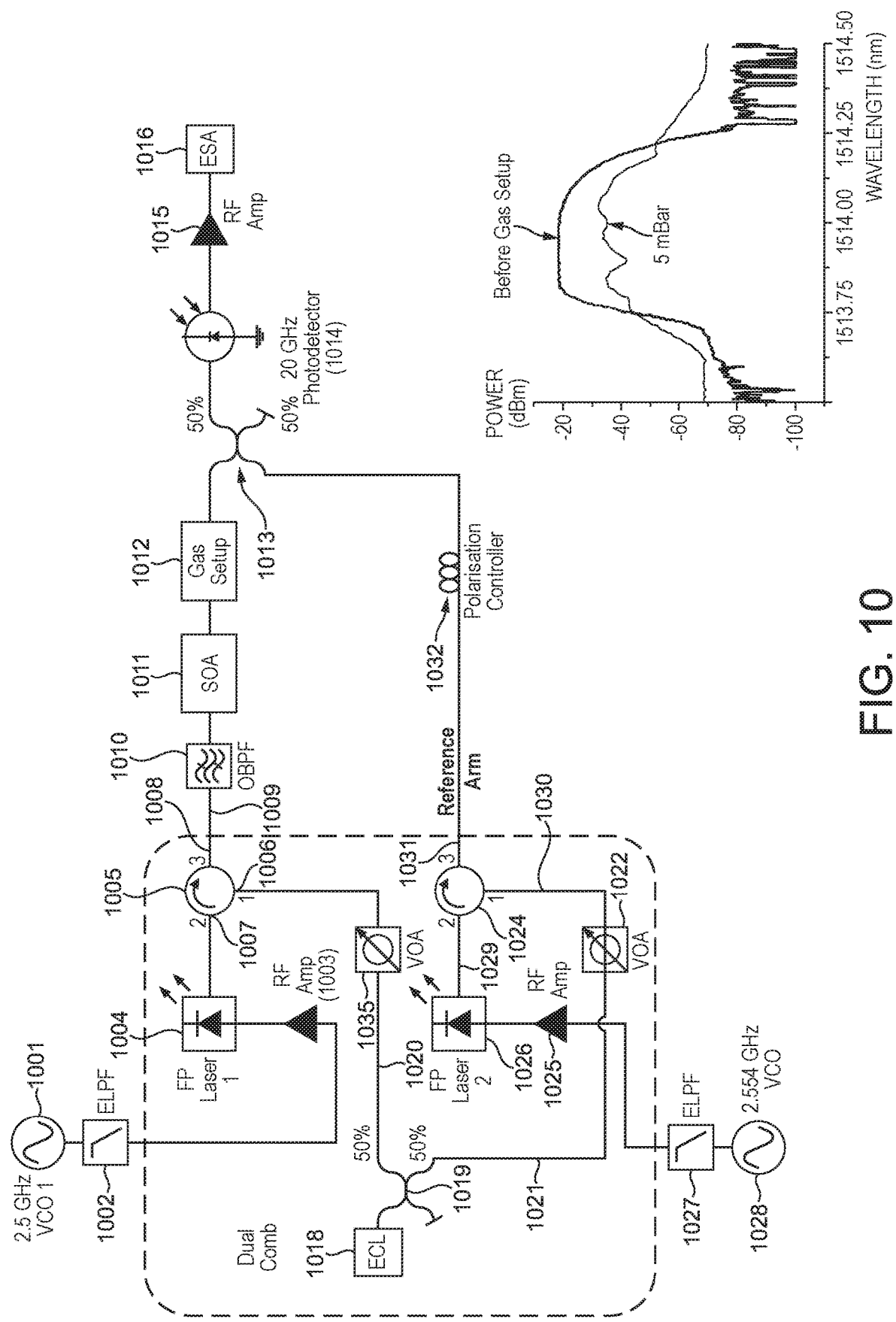
FIG. 10 shows a detailed example of a dual comb spectroscopy device with resulting output spectrum (inset)

FIG. 10 schematically illustrates a dual frequency comb spectrometer according to another embodiment of the invention. The spectrometer comprises a master laser 1018 in the form of an extended cavity laser configured to generate output seed light for input to each one of a first slave laser 1004 and a second slave laser 1026 so as to injection lock the two slave lasers thereby to cause them to generate mutually coherent optical outputs. Each of the first and second slave lasers are separately driven by a process of gain switching so as to produce an optical output in the form of optical pulses uniformly separated in time at a fixed respective pulse repetition rate (see FIG. 14A).

Figure 14B:
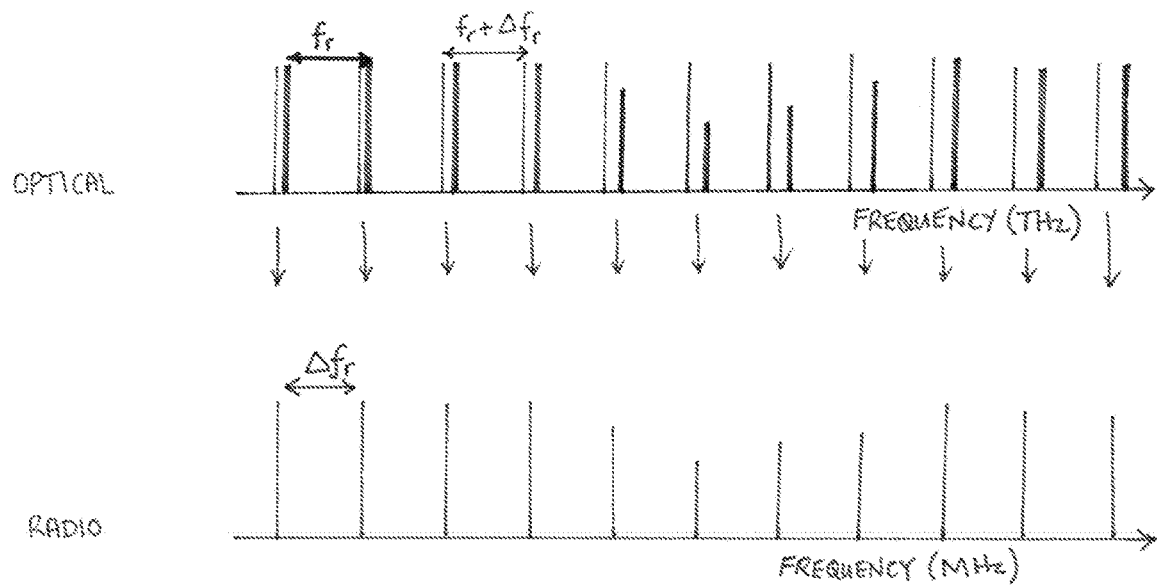

Once more, the free spectral range of the second slave laser is controlled so as to be slightly different from the free spectral range of the first slave laser (see FIG. 14B: optical frequency spectrum). The result is that the frequency spectrum of the first slave laser comprises a first frequency comb and the frequency spectrum of the second slave laser comprises a second frequency comb with a slightly different free spectral range. The spectrometer is configured to direct the first frequency comb through a gas cell 1012 arranged to contain a simple gas for spectroscopic study/detection, and to subsequently combine the first frequency comb with the second frequency comb (see FIG. 14B: optical frequency combs) for interference at a photodetector to generate beat tones (see FIG. 14B: radio frequency comb) represented by the electrical output of the photodetector for input to an electrical signal analyser 1016 for spectroscopic analysis.

The optical output of the master laser 1018 is optically coupled to an optical input port of an optical coupler 1019 configured to split the input received light into two portions of equal intensity (50%/50% split), and to output each of the two equal portions on separate respective optical outputs of the optical coupler thereby to provide two separate seed light signals (1020, 1021) for input, respectively, to the first slave laser 1004 and the second slave laser 1026. Each one of the two seed light signals is directed through a respective variable optical attenuator (VOA: 1035, 1022) arranged in optical communication between the master laser and the respective first and second slave lasers. These attenuators permit fine adjustment of the intensity of seed light input to a respective slave laser. The optical output port of each of the variable optical attenuators is optically coupled to a first input port of a respective optical circulator (1005, 1024) each configured with three optical ports. The second optical port (1007, 1029) of each optical circulator is optically coupled to a respective one of the first slave laser and the second slave laser (1004, 1026) for permitting injection of seed light into the slave laser thereby enabling injection-locking and causing the first and second optical combs of the first and second slave lasers to be coherent.

Furthermore, the second optical port (1007, 1029) of each of the first and second optical circulators is also configured to receive into the optical circulator, the first or second optical comb, respectively, from the slave laser to which it is optically coupled. Each optical circulator further comprises a third optical port (1008, 1031) configured to output a received optical comb from the respective optical circulator for on the transmission through the spectrometer.

Each of the first and second slave lasers (1004, 1026) takes the form, in this example, of a Fabry-Perot laser driven by a respective voltage oscillator power source (1001, 1028) a process of gain switching. The oscillating voltage signal from the respective voltage power source first passes through an electrical low-pass filter (ELPF: 1002, 1027) designed to remove high-frequency not components from the voltage signal, and subsequently passes through an amplifier (RF Amp: 1003, 1025) configured to amplify the filtered, oscillating voltage signal immediately prior to input to the respective first or second slave laser.

The drive frequency of the oscillating voltage signal 1001 configured to drive the first slave laser is, in this example, 2.5 GHz whereas the drive frequency of the oscillating voltage signal 1028 configured to drive the second slave laser is 2.554 GHz. The difference in frequency is 0.054 GHz, and this frequency difference results in the difference in the free spectral range of the first optical comb relative to the second optical comb.

The third output port of the optical circulator optically coupled to the first slave laser, is optically coupled to the input port of an optical bandpass filter 1010 configured to pass a selected frequency range of the comb components within the first optical comb, and to output the result to a semiconductor optical amplifier (SOA: 1011) configured to optically amplify the filtered first optical comb and to output the result to a gas chamber 1012 containing a simple gas to be detected or analysed spectroscopically.

Concurrently, the third optical output port of the optical circulator optically coupled to the second slave laser, is optically coupled to the input port of a polarisation controller 1032 arranged to adjust the polarisation state of the photons of the second optical, as appropriate or desirable. The optical output port of the gas chamber 1012 and the optical output port of the polarisation controller 1032 is each coupled to a respective one of two optical input ports of an optical combiner 1013 configured to combine the first and second optical combs received by it, and to split the combined optical signal in equal proportion (50%/50%) such that one half of the combined is directed to a photodetector 1014 which is configured to operate at a signal detection rate of the difference frequency (e.g. 20 GHz, or more preferably <10 GHz, such as 100s of MHz). The electrical output of the photodetector is coupled to the electrical signal input port of an electrical spectrum analyser (ESA: 1016) via an electrical amplifier (RF Amp: 1015).

The optical spectrum shown as an inset in FIG. 10 illustrates two wavelength spectra produced by the spectrometer of FIG. 10. A first spectrum shows the output of the electrical spectrum analyser 1016, displayed as a function of wavelength rather than frequency, when no sample gas is present in the gas chamber 1012 of the spectrometer. Conversely, a second spectrum is concurrently shown which illustrates how the spectrum changes when a sample gas is present in the gas chamber at a pressure of 5 mbar: in particular, spectral absorption bands are clearly present and these are diagnostic of the sample gas.

Figure 11:
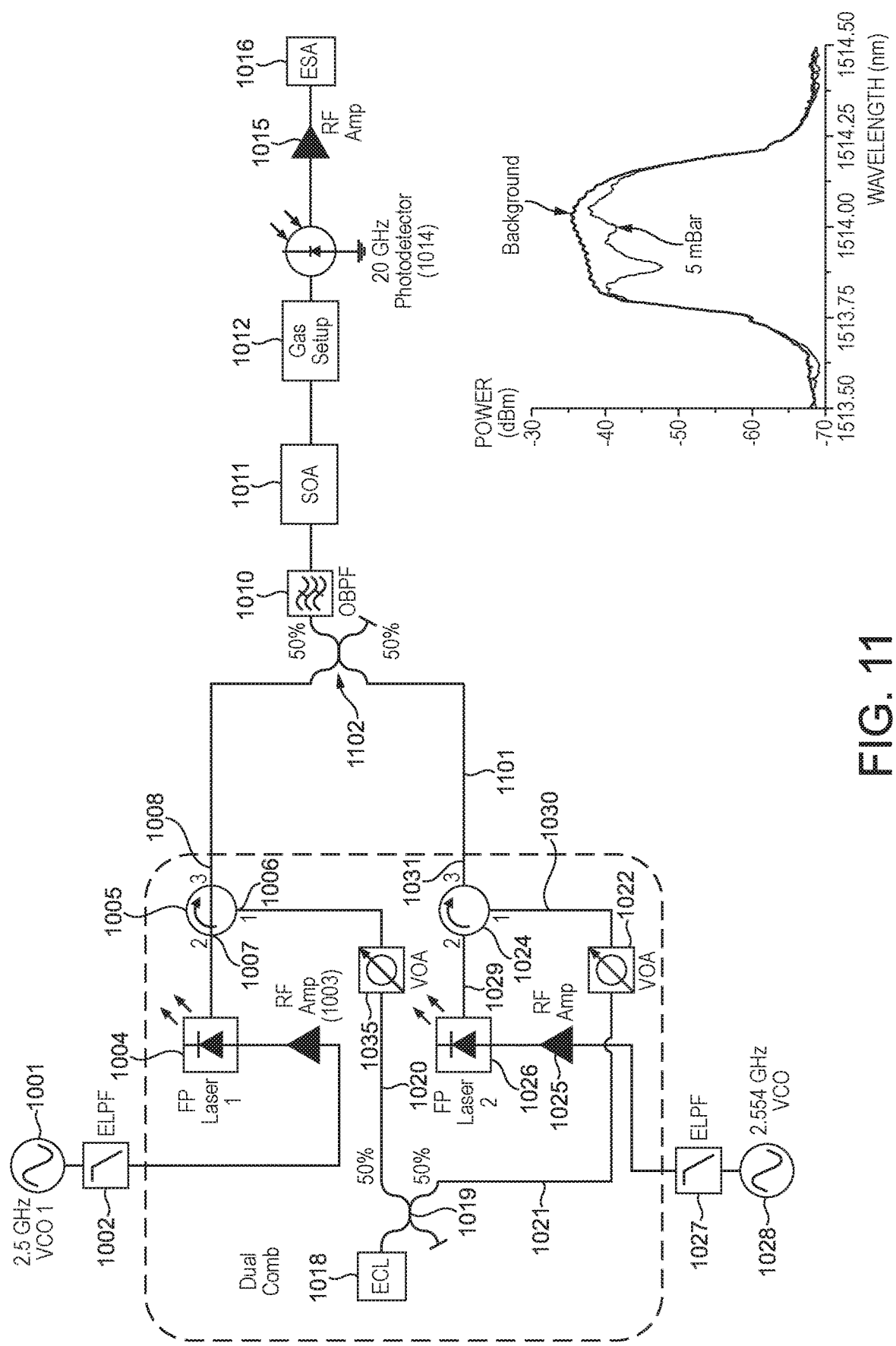
FIG. 11 shows a detailed example of a further dual comb spectroscopy device with resulting output spectrum (inset)

FIG. 11 schematically illustrates a spectrometer very similar in design to the spectrometer illustrated in FIG. 10, but differing by virtue of being configured to combine both the first frequency comb 1008 and the second frequency comb 1101, from the first and second slave lasers respectively, before passing the combined comes into the gas chamber 1012 via the optical bandpass filter and semiconductor optical amplifier, in common.

Figure 12:
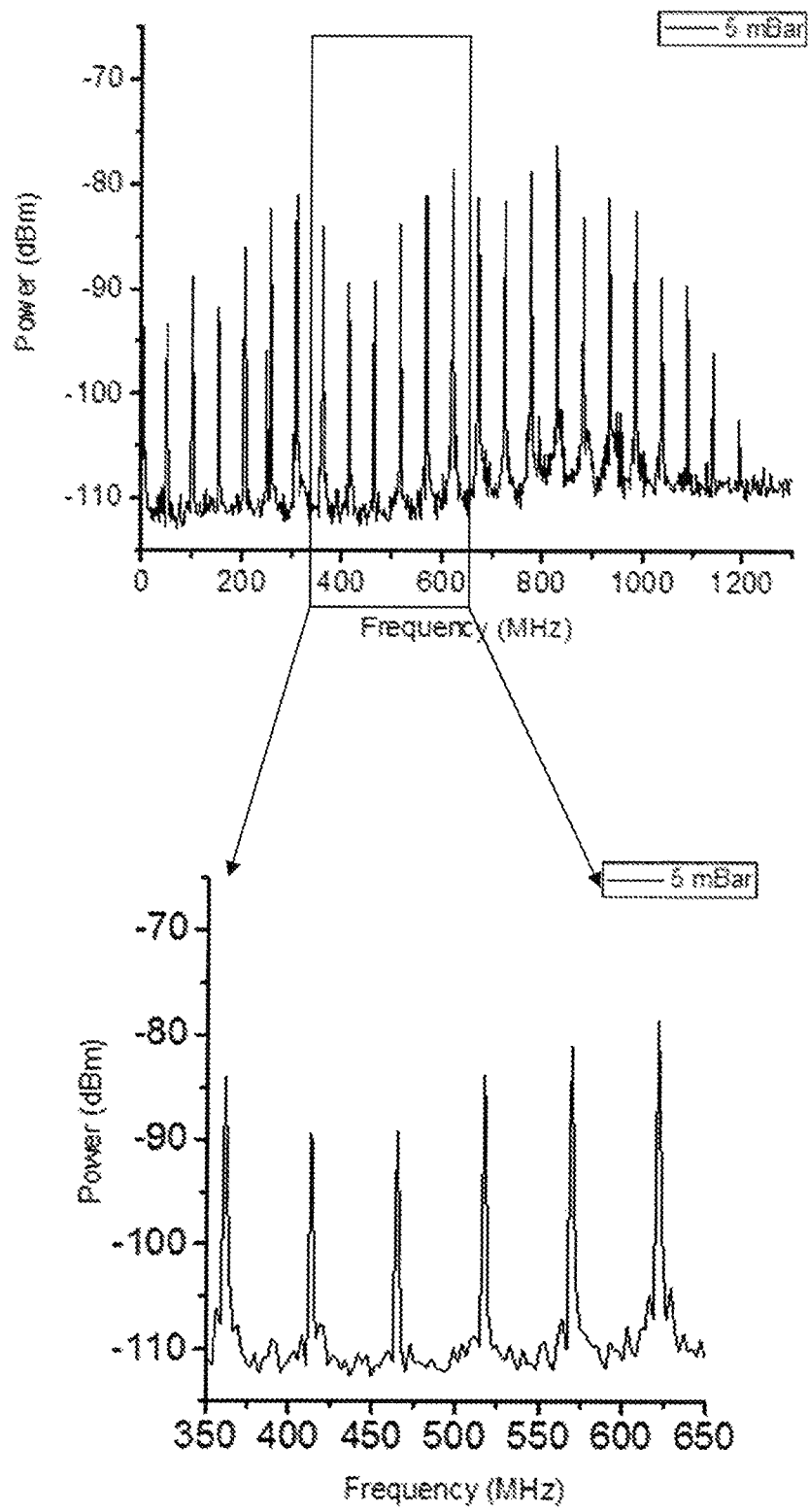
FIG. 12 shows a frequency comb spectrum generated according to an embodiment of the invention, including an expanded view thereof (lower part)
Figure 13:
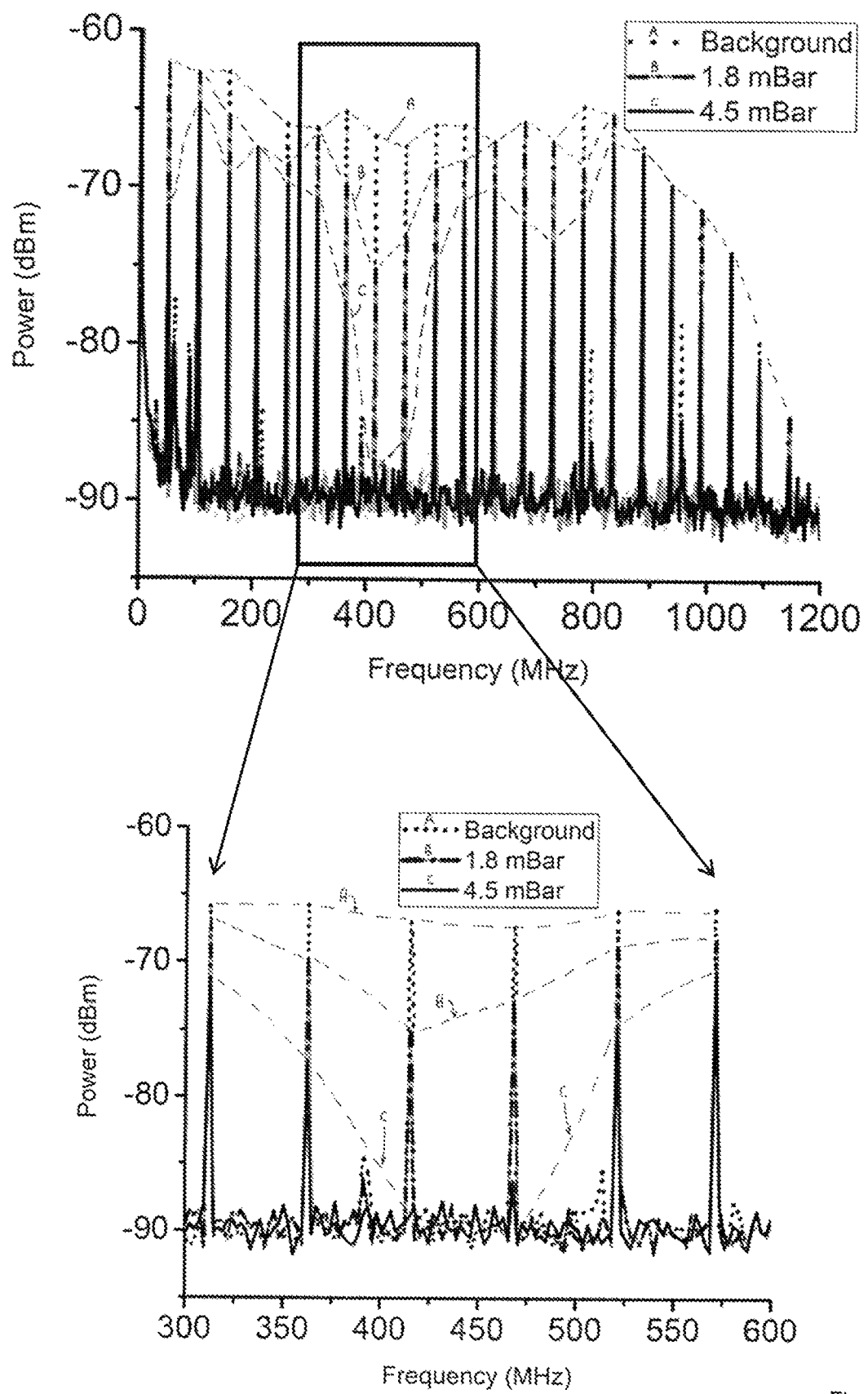
FIG. 13 shows multiple frequency comb spectra each generated according to an embodiment of the invention, including an expanded view thereof (lower part)

FIG. 12 schematically illustrates an example of a radio frequency comb of beat tones (see FIG. 14B) typically generated by a spectrometer according to embodiments of the invention, and extending over a radio frequency range from about 50 MHz to about 1200 MHz, together with a magnified section extending of the spectral range from 350 MHz to 650 MHz comprising six beat tones. A spectral absorption band is visible in the reduced amplitudes of the six beat tones illustrated in the magnified section which is diagnostic of a gas detected by the spectrometer. These results were obtained for a sample gas (Ammonia) under a pressure of 5 mbar. FIG. 13 shows a corresponding example of a set of radio frequency combs (beat tones) obtained at increasing successive gas pressures. This illustrates how the diagnostic optical absorption band of the sample gas becomes increasingly apparent in the beat tone spectrum as gas pressure increases and optical absorption is enhanced.

The line width of the master laser, according to any embodiment, is preferably no greater than 1 MHz, and is more preferably no greater than 100 kHz. The line width of the master laser is selected so that the concurrent seed light signals input to the first and second slave lasers by the master laser causes the slave lasers to produce phase-coherent optical outputs by the process of injection locking. The line width of the master laser is as small as necessary to achieve a correlation length which is equal to or greater than the optical path length between the master laser and the slave laser into which seed light is input. The seed light input to the first slave laser remains phase-coherent with the seed light input to the second slave laser at the point of respective input. This correlates the phases of the first and second slave lasers, and promotes cleaner (less noisy) radio frequency combs (beat tone spectrum) which are phase correlated.

Although preferred embodiment(s) of the present invention have been shown and described, it will be appreciated by those skilled in the art that changes may be made without departing from the scope of the invention as defined in the claims.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of preferred embodiments and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A dual comb spectroscopy device for spectroscopically detecting a sample substance, comprising:
   a first slave laser light source configured to generate a first optical output, the optical spectrum of which comprises a first frequency comb having a first comb free spectral range;
   a second slave laser light source configured to generate a second optical output, the optical spectrum of which comprises a second frequency comb having a second comb free spectral range which is different from the first comb free spectral range;
   a master laser light source comprising a single laser light source configured to inject seed light in to both the first slave laser light source and the second slave laser light source therewith to injection lock said generation of both the first optical output and the second optical output;
   a photodetector part arranged to combine the first optical output and the second optical output and to detect a beat signal the spectrum of which comprises a third frequency comb including beat tones produced by interference between the combined first and second optical outputs;
   wherein the device comprises a sample detection area configured for receiving the sample for detection and for directing at least one of the first optical output and the second optical output to the photodetector part via the sample detection area.

2. The device according to claim 1 wherein the beat signal is a radio-frequency, RF, signal the spectrum of which comprises radio-frequency beat tones.

3. The device according to claim 2 wherein the frequency of one of more of said radio-frequency beat tones is a value within one of: the Very High Frequency, VHF, radio frequency band; the High Frequency, HF, radio frequency band; the Medium Frequency, MF, radio frequency band.

4. A remote detector system for remotely detecting a sample substance comprising the device according to claim 2 and a receiver unit remote from the device and including a radio signal receiver unit including a receiver antenna configured to wirelessly receive said RF signal corresponding to said beat signal.

5. The device of claim 1 further comprising: a first arm originating at the first slave laser light source and ending at an optical combiner, a second arm originating at the second slave laser light source and ending at the optical combiner, and a third arm originating at the optical combiner and ending at the photodetector part.

6. The device of claim 5, wherein at least one of the first arm, second arm and third arm are provided by at least one optical fibre.

7. The device of claim 5, wherein either: the first arm includes the sample detection area; the second arm includes the sample detection area; or the third arm includes the sample detection area.

8. The device of claim 7, wherein the arm comprising the sample detection area comprises a first optical path and a second optical path, wherein an end of the first optical path is aligned with an end of the second optical path, and the sample detection area is defined as an area between the aligned ends of the first and second optical paths.

9. The device of claim 1, wherein said first slave laser light source and said second slave laser light source are each configured to generate said first optical output and said second optical output, respectively, by gain switching of a lasing cavity thereof.

10. The device of claim 1, wherein at least one of the first slave laser light source and the second slave laser light source comprises a distributed feedback laser.

11. The device of claim 1, wherein the seed light generated by the master light source is split into a first seed light and a second seed light, wherein the first slave laser light source receives the first seed light and the second slave laser light source receives the second seed light.

12. A dual comb spectroscopy device according to claim 1 further comprising an analyser unit configured to:
provide a reference beat signal;
determine a difference between the detected beat signal and the reference beat signal; and
output a sample analysis result based on the determined difference.

13. The device of claim 12, wherein the analyser unit is arranged to determine a plurality of differences between the detected beat signal and the reference beat signal, and to output one or more sample analysis results based on the determined differences.

14. The device of claim 12, wherein a said difference between the detected beat signal and the reference beat signal comprises a difference in the amplitude of one or more corresponding beat tones thereof.

15. A device according to claim 1 comprising a radio signal transmitter unit including a transmitter antenna configured to wirelessly transmit an RF signal corresponding to said beat signal.

16. The device of claim 1, wherein the first comb repetition frequency differs from the second comb repetition frequency by a frequency difference the value of which is within one of:
the Very High Frequency, VHF, radio frequency band; the High Frequency, HF, radio frequency band; the Medium Frequency, MF, radio frequency band.

17. A method of dual comb spectroscopy for spectroscopically detecting a sample substance, comprising:
generating a first optical output from a first slave laser light source, the optical spectrum of which comprises a first frequency comb having a first comb free spectral range;
generating a second optical output from a second slave laser light source, the optical spectrum of which comprises a second frequency comb having a second comb free spectral range which is different from the first comb free spectral range;
injecting seed light from a master laser light source comprising a single laser light source in to both the first slave laser light source and the second slave laser light source therewith to injection lock said generation of both the first optical output and the second optical output;
directing at least one of the first optical output and the second optical output through or via the sample substance;
combining the first optical output and the second optical output at a photodetector and therewith detecting a beat signal the spectrum of which comprises a third frequency comb including beat tones produced by interference between the combined first and second optical outputs.

18. The method according to claim 17 wherein the beat signal is a radio-frequency, RF, signal the spectrum of which comprises radio-frequency beat tones.

19. The method according to claim 18 comprising wirelessly transmitting an RF signal corresponding to said beat signal.

20. The method according to claim 17, including generating said first optical output and said second optical output, respectively, by applying gain switching to a lasing cavity of said first slave laser light source and said second slave laser light source.

* * * * *